United States Patent [19]
Shinozaki

[11] Patent Number: 5,861,648
[45] Date of Patent: Jan. 19, 1999

[54] CAPACITOR UNIT OF A BOOSTER CIRCUIT WHOSE LOW-VOLTAGE OPERATING POINT MARGIN CAN BE EXPANDED WHILE AN INCREASE IN AREA OCCUPIED THEREBY IS SUPPRESSED

[75] Inventor: Naoharu Shinozaki, Kawasaki, Japan

[73] Assignee: Fujitsu Limited, Kanagawa, Japan

[21] Appl. No.: 917,748

[22] Filed: Aug. 27, 1997

[30] Foreign Application Priority Data

Apr. 3, 1997 [JP] Japan ................................ 9-085270

[51] Int. Cl.⁶ ................................................ H01L 29/40
[52] U.S. Cl. ........................ 257/299; 257/300; 257/532; 438/239
[58] Field of Search .................................. 257/299, 300, 257/532; 438/210, 239, 393, 394

[56] References Cited

U.S. PATENT DOCUMENTS

| | | | |
|---|---|---|---|
| 4,591,738 | 5/1986 | Bialas, Jr. et al. | 257/299 |
| 4,831,431 | 5/1989 | Hanlon | 257/535 |
| 5,530,274 | 6/1996 | Fujioka | 257/300 |
| 5,631,492 | 5/1997 | Ramus et al. | 257/532 |

FOREIGN PATENT DOCUMENTS

| | | | |
|---|---|---|---|
| 2-137256 | 5/1990 | Japan | 257/532 |
| 5-82741 | 4/1993 | Japan | 257/532 |

*Primary Examiner*—David B. Hardy
*Attorney, Agent, or Firm*—Nikaido, Marmelstein Murray & Oram LLP

[57] ABSTRACT

A booster circuit is used to boost a first voltage using a capacitor unit so as to generate a second voltage. The capacitor unit has at least one MOS capacitor each formed by a MOS transistor, and at least one conductive electrode capacitor, each connected in parallel with corresponding MOS capacitor. Each conductive electrode capacitor includes a first conductive electrode and a second conductive electrode which are mutually opposed, and a dielectric layer interposed between the first and second conductive electrodes. Therefore, the low-voltage operating point margin of the booster circuit can be expanded while an increase in the area occupied by the booster circuit is suppressed.

12 Claims, 6 Drawing Sheets

CAPACITOR UNIT OF A BOOSTER CIRCUIT WHOSE LOW-VOLTAGE OPERATING POINT MARGIN CAN BE EXPANDED WHILE AN INCREASE IN AREA OCCUPIED THEREBY IS SUPPRESSED

BACKGROUND OF THE INVENTION

1. Field of the Invention

The present invention relates to a booster circuit and a semiconductor integrated circuit having the booster circuit, and more particularly, to a booster circuit for boosting a supply voltage using MOS capacitors.

2. Description of the Related Art

Recently, semiconductor integrated circuits have been designed to realize fine circuitry and large-scale integration and to operate at a lower supply voltage (driving voltage) for the purpose of reducing power consumption. Therefore, a booster circuit for boosting and supplying a supply voltage has been employed, in order to supply an optimum voltage to each circuit.

Namely, in the prior art, when voltages other than external supply voltages VCC and VSS must be used within a chip having a semiconductor integrated circuit formed thereon, voltages of levels desired within the chip are generated by the semiconductor integrated circuit itself for due use. This kind of power supply is usually referred to as an internal power supply.

Specifically, when a dynamic random access memory (DRAM) is taken for instance, a cell transistor serving as a memory cell is generally formed with an N-channel type transistor. In order to operate the cell transistor so that the threshold voltage Vth thereof remains unknown, a voltage having a level equal to or higher than a level VCC+Vth must be applied to the gate of the cell transistor. A voltage level higher than the supply voltage VCC is referred to as a booster level. A circuit for generating a voltage of a booster level, that is, a booster voltage is referred to as a booster circuit.

The booster circuit is designed to, for example, carry out a boost operation using MOS capacitors. Along with the trend toward a lower supply voltage, there arises a problem that the margin of a low-voltage operating point decreases. Under the circumstances, a demand exists for a booster circuit whose low-voltage operating point margin can be expanded while an increase in the area occupied by the circuit is suppressed.

The prior art booster circuit and problems associated with the prior art booster circuit will be described in detail later with reference to drawings.

SUMMARY OF THE INVENTION

An object of the present invention is to provide a booster circuit whose low-voltage operating point margin can be expanded while an increase in the area occupied by the circuit is suppressed.

According to the present invention, there is provided a booster circuit for boosting a first voltage using a capacitor unit so as to generate a second voltage, wherein the capacitor unit comprises at least one MOS capacitor each formed by a MOS transistor; and at least one conductive electrode capacitor, connected in parallel with a corresponding MOS capacitor, and each conductive electrode capacitor including a first conductive electrode and a second conductive electrode which are mutually opposed, and a dielectric layer interposed between the first and second conductive electrodes.

Further, according to the present invention, there is also provided a semiconductor integrated circuit comprising a booster circuit for boosting a first voltage using a capacitor unit so as to generate a second voltage and a function circuit for receiving an output voltage of the booster circuit, and being formed as a one-chip circuit, wherein the capacitor unit comprises at least one MOS capacitor each formed by a MOS transistor; and at least one conductive electrode capacitor, each connected in parallel with a corresponding MOS capacitor, and each conductive electrode capacitor including a first conductive electrode and a second conductive electrode which are mutually opposed, and a dielectric layer interposed between the first and second conductive electrodes.

A capacitance value of each of the conductive electrode capacitors may be set to be smaller than a capacitance value of each of the MOS capacitors. A size of the first and second conductive electrodes constituting each conductive electrode capacitor may be set to be smaller than that of the gate of the MOS transistor constituting each MOS capacitor.

The first conductive electrode of each conductive electrode capacitor may be formed in a first conductive layer containing multilayer wiring, the second conductive electrode thereof may be formed in a second conductive layer containing multilayer wiring, and the dielectric layer may be formed with an interlayer insulating film interposed between the first conductive layer and the second conductive layer. The first conductive layer and the second conductive layer may be adjoining conductive layers. The first conductive layer may be a lowermost metallic wiring layer, and the second conductive layer may be an uppermost polysilicon layer. The first conductive layer and the second conductive layer may be conductive layer located near a semiconductor substrate. A plurality of the capacitor units may be provided in order to carry out a boost operation according to timings of rise and fall of a boost activation signal used to control the boost operation.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

To begin with, before a mention is made of an embodiment of the present invention, a known booster circuit and problems underlying the booster circuit will be described with reference to the drawings.

Figure 1:
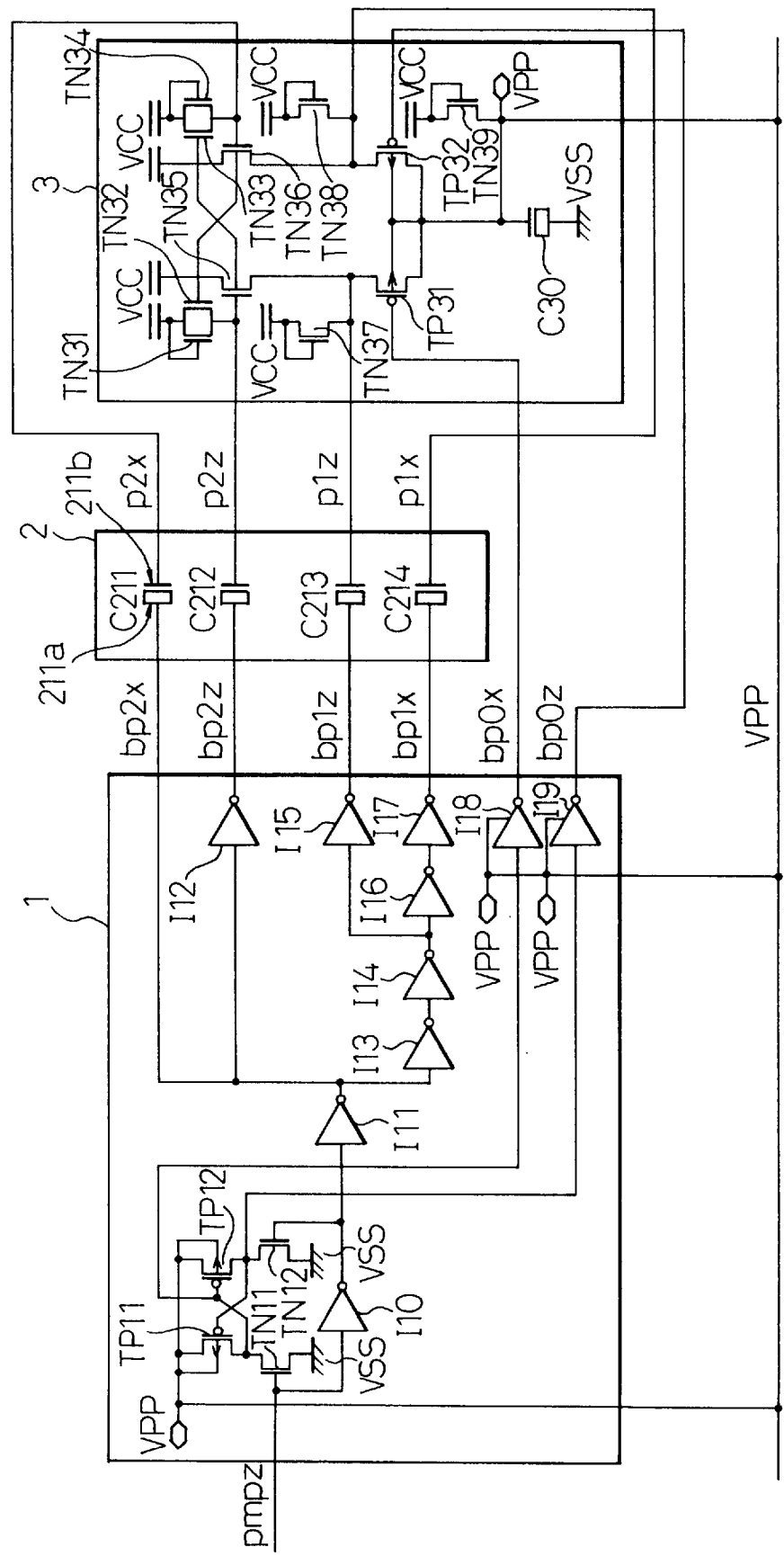
FIG. 1 is a circuit diagram showing an example of a known booster circuit.

FIG. 1 is a circuit diagram showing an example of a known booster circuit, wherein the booster circuit is a general booster circuit for generating a voltage (second voltage) VPP higher than an external voltage (first voltage) VCC.

In FIG. 1, there are shown a boost timing controller 1 for adjusting the timing of a boost operation, a boost capacitor unit 2 including capacitors for producing a booster voltage, and a booster unit 3 for holding the booster voltage in the form of charge.

As shown in FIG. 1, the boost timing controller 1 comprises P-channel type MOS transistors TP11 and TP12, N-channel type MOS transistors TN11 and TN12, and inverters I10 to I19. The booster unit 3 comprises P-channel type MOS transistors TP31 and TP32, N-channel type MOS transistors TN31 to TN39, and a capacitor C30. A boost activation signal pmpz is supplied to the boost timing controller 1. Every time the boost activation signal pmpz is driven high or low, a booster voltage is applied so that a high voltage VPP can be generated.

The boost capacitor unit 2 comprises MOS capacitors C211 to C214, and thus, a plurality of (four) MOS capacitors C211 to C214 are included therein. A boost operation is carried out according to the timing of the rise and fall of the boost activation signal pmpz used to control the boost operation.

Figure 2:
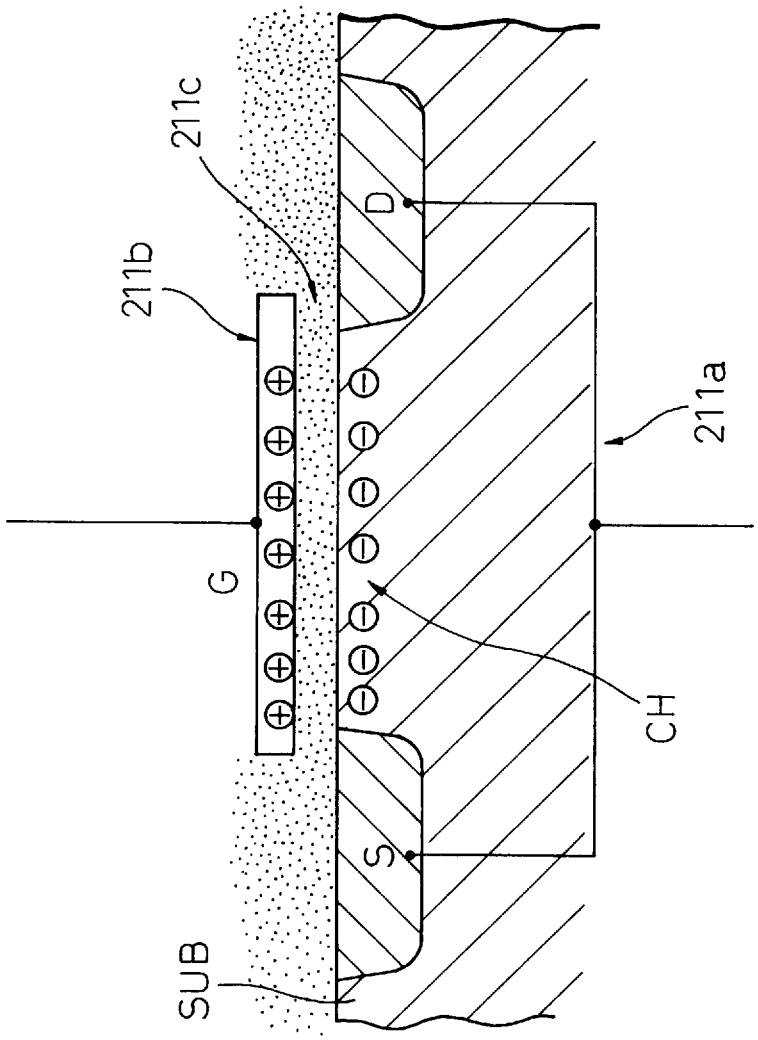
FIG. 2 is a diagram showing the structure of a MOS capacitor.

FIG. 2 is a diagram showing the structure of a MOS capacitor. In FIG. 2, there are shown a first electrode 211a, second electrode 211b, and insulating film ($SiO_2$ film) 211c. Also shown are a gate G, source S, drain D, channel CH formed between the source and drain, and a semiconductor substrate SUB.

As shown in FIG. 2, the MOS capacitor C211 (C212 to C214) is formed with an N-channel type MOS transistor. The drain D and source S of the transistor are strapped to form the first electrode 211a (actually, a channel CH formed between the source S and drain D), and the gate thereof is used as the second electrode 211b. The first electrode 211a (channel CH between the source and drain), second electrode 211b (gate G), and insulating film ($SiO_2$ film) 211c interposed between the channel between the source and drain and the gate G constitute a capacitor.

Figure 3:
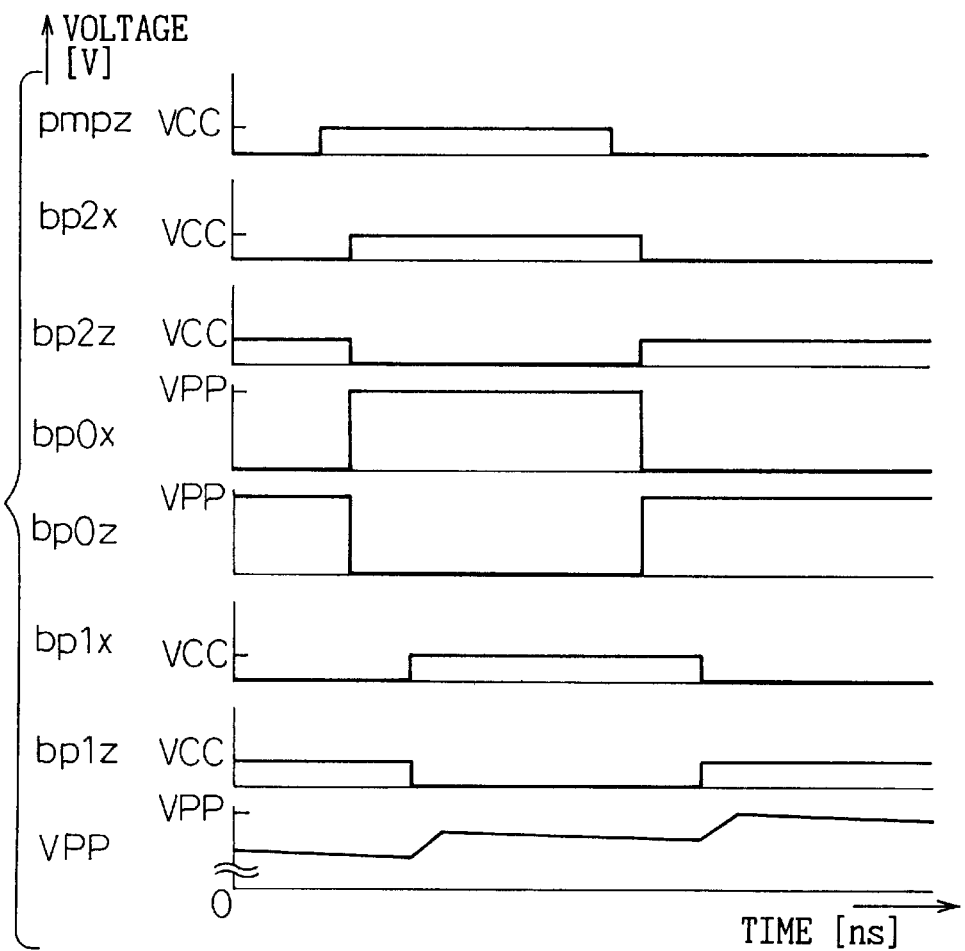
FIG. 3 is a waveform diagram for explaining the operations of the booster circuit.
Figure 5:
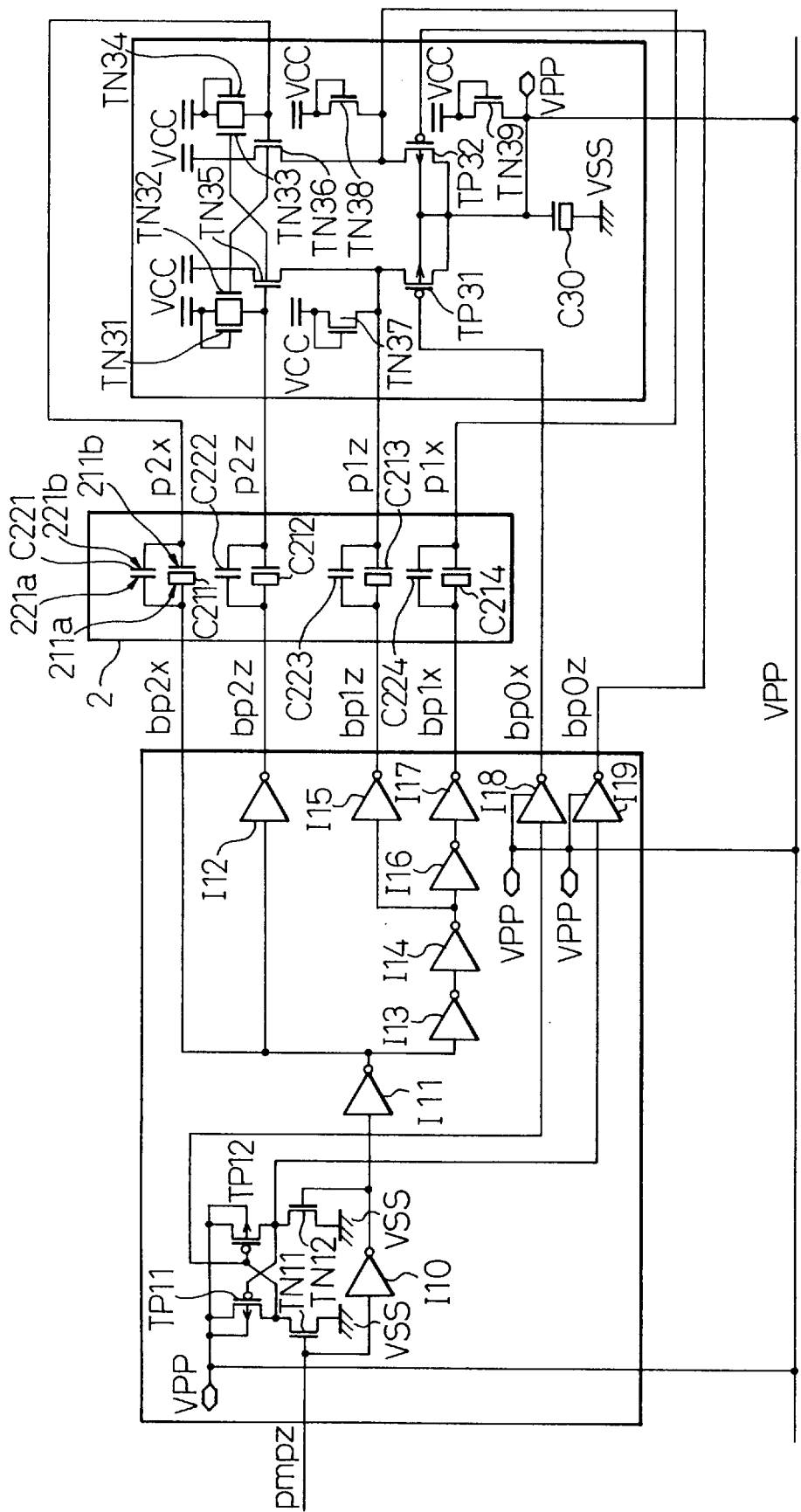
FIG. 5 is a circuit diagram showing an embodiment of the booster circuit of the present invention.

FIG. 3 is a waveform diagram for explaining the operations of the booster circuit, wherein the operations of the booster circuit shown in FIG. 1 are explained. Incidentally, the operations of a booster circuit, which will be described later, shown in FIG. 5 are identical to those of the booster circuit shown in FIG. 1.

In the waveform diagram shown in FIG. 3, signals bp2x, bp2z, bp1z, and bp1x are input signals to be applied to the first electrodes (channels between sources and drains) of the MOS capacitors C211 to C214. Signals bp0x and bp0z are output signals of the inverters I18 and I19. As shown in FIG. 1, signals p2x, p2z, p1z, and p1x are signals output through the second electrodes (gates) of the MOS capacitors C211 to C214.

As shown in FIG. 3, when the boost activation signal pmpz makes a low-to-high transition, the input signals bp2x and bp2z of the MOS capacitors C211 and C212 are driven low and high respectively. The output signals p2x and p2z have voltage levels VCC+α (ideally 2 VCC) and VCC-Vth respectively. As for the input signals p1z and p1x of the MOS capacitors C213 and C214, the signal p1z is charged with the voltage VCC but the signal p1x becomes a floating potential at the VCC level.

Nearly simultaneously, the output signals bp0x and bp0z of the inverters I18 and I19 are driven high and low respectively. The transistor TP31 is turned off and the transistor TP32 is turned on.

The input signal bp1x of the MOS capacitor C214 is driven high, and the output signal p1x thereof has a voltage level of VCC+α (ideally 2 VCC). The developed charge is then propagated over a high-voltage power line VPP via the transistor TP32.

The capacitor C30 in the booster unit 3 is a large capacitor. Charge required for outputting a high voltage VPP is accumulated in the capacitor C30. With the charge accumulated in the capacitor C30, the high voltage VPP is supplied to a circuit needing the high voltage.

Likewise, when the boost activation signal pmpz makes a high-to-low transition, the output signal p1z of the MOS capacitor C213 is charged with the supply voltage VCC. When the input signal bp1z of the MOS capacitor C213 is driven high, the output signal p1z has a voltage level of VCC+α. The developed charge is propagated over the high-voltage power line VPP via the transistor TP31.

As mentioned previously, for example, the known booster circuit shown in FIG. 1 can generate the high voltage VPP using, for example, the supply voltage VCC.

However, the capacitors C211 to C214 in the boost capacitor unit 2 are formed with MOS capacitors that are N-channel type MOS transistors having the drains and sources thereof strapped to form the first electrodes (211a) and using the gates thereof as the second electrodes (211b).

For enabling each of the devices (MOS capacitors) C211 to C214 to operate electrically as a capacitor, a pair of opposed electrodes and a structure acting as a dielectric are all that is needed. As shown in FIG. 2, the gate G of an N-channel type MOS transistor, a channel CH between the source S and drain D thereof, and an oxide film (insulating film, $SiO_2$ film) between the gate G and the channel CH between the source and drain constitute a capacitor.

In recent years, semiconductor integrated circuits (for example, a DRAM) have had a progressive tendency toward a lower supply voltage. The potential difference between a high supply voltage VCC and low supply voltage VSS tends to decrease. Under the circumstances, forming a channel between a source and drain which is required for enabling a MOS capacitor to function as a capacitor has substantially reached its limits.

To be more specific, for forming a channel between a source and drain, a potential difference equal to or higher than the threshold voltage Vth of an N-channel type MOS transistor used as a capacitor must be induced between the gate and source of the transistor. In the aforesaid example of a booster circuit, for example, the gate (211b: p2x) of the N-channel type MOS transistor serving as the MOS capacitor C211 is pre-charged by the voltage level VCC-Vth. The potential difference between the source and drain (211a: bp2x) is then changed from the voltage level VSS to the voltage level VCC, whereby a boost operation is carried out. If the pre-charge level VCC-Vth becomes equal to or lower than, for example, the threshold voltage Vth, a channel is not formed between the source and drain. Consequently, the boost fails.

A currently-adopted measure is such that transistors whose threshold voltage is low are used as the MOS capacitors C211 to C214 constituting the boost capacitor unit 2, and the threshold voltage Vth remains unknown. However, this measure cannot be said to be a radical measure.

An embodiment of a booster circuit in accordance with the present invention will be explained with reference to the drawings below.

Figure 4:
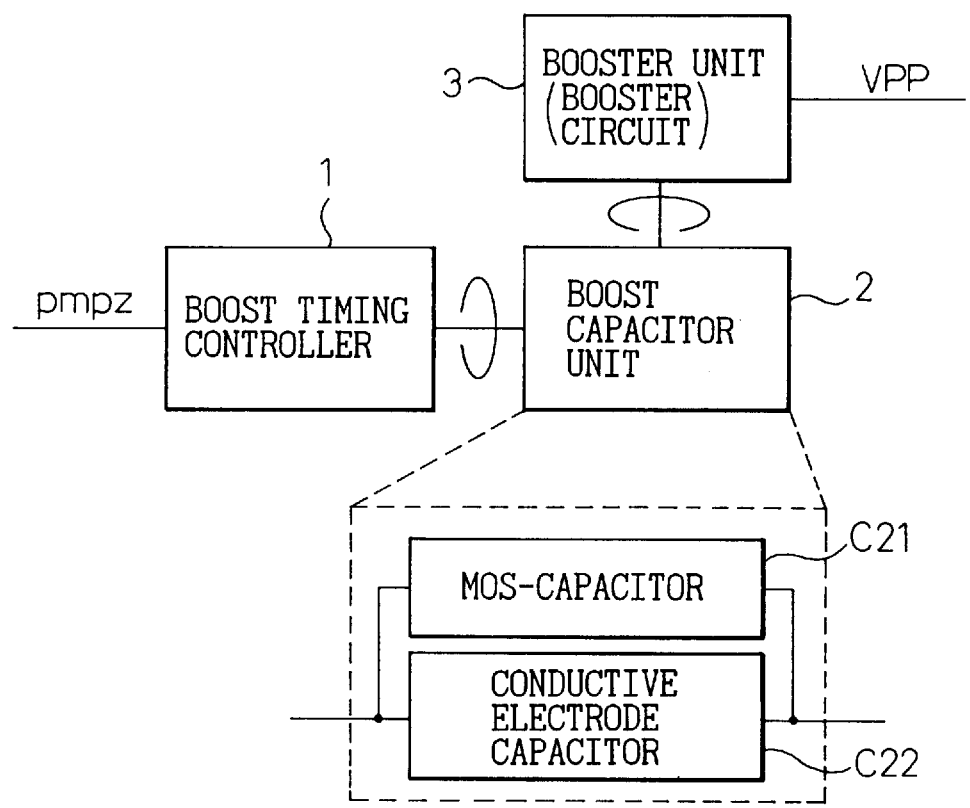
FIG. 4 is a block diagram showing the principles and configuration of a booster circuit in accordance with the present invention.

FIG. 4 is a block diagram showing the principles and configuration of a booster circuit in accordance with the present invention. In FIG. 4, there are shown a boost timing controller 1 for adjusting the timing of a boost operation, a boost capacitor unit (capacitor unit) 2 including capacitors for producing a booster voltage, and a boost unit 3 for holding the booster voltage in the form of charge.

As shown in FIG. 4, the boost capacitor unit 2 comprises MOS capacitors C21 and conductive electrode capacitors C22 connected in parallel with the MOS capacitors C21. The conductive electrode capacitors C22 are connected in parallel with the MOS capacitors C21 in the boost capacitor unit 2.

Each of the conductive electrode capacitors C22 (C221: See FIG. 6) includes a first conductive electrode (221a) and second conductive electrode (221b) which are mutually opposed. The first conductive electrode and second conductive electrode, and a dielectric layer (insulating layer: 221c) interposed between the first and second conductive electrodes constitute a capacitor. The conductive electrode capacitors C22 can be formed with a film between the wiring layers in a chip and are electrically equivalent to a capacitor shaped like a plane parallel plate.

Each of the MOS capacitors C21 (C211: See FIG. 6) is identical to that shown in FIG. 2, and is formed with an N-channel type MOS transistor having the drain D and source S thereof strapped to form a first electrode (211a: actually, a channel CH formed between the source S and drain D), and using the gate G thereof as a second electrode (211b). The first electrode and second electrode, and an insulating film ($SiO_2$ film: 211c) interposed between the channel between the source and drain and the gate constitute a capacitor.

Since the conductive electrode capacitors C22 have no threshold voltage Vth, the margin of a low-voltage operating point thereof is wider than that of the MOS capacitors C21. However, the conductive electrode capacitors C22 are formed, for example, with a film interposed between wiring layers. The thickness of the film is not determined precisely, and the capacitance therefore varies from capacitor to capacitor. Moreover, generally, the conductive electrode capacitors C22 each have an oxide film whose thickness is larger by two digits or more than that of a transistor. For providing a capacitance equivalent to that of a MOS capacitor, the area occupied by the conductive electrode capacitors C22 becomes considerably large.

Preferably, the capacitance of the conductive electrode capacitors C22 should be set to a value smaller than the capacitance of the MOS capacitors C21, so that even when the capacitance of the conductive electrode capacitors C22 varies, an overall capacitance (synthetic capacitance of the capacitances of the MOS capacitors C21 and conductive electrode capacitors C22 which are connected in parallel with one another) will not be largely affected. In consideration of an area occupied by the booster circuit (capacitors), for example, the size of the first and second conductive electrodes constituting each of the conductive electrode capacitors C22 (the size of the coincident parts of the first and second conductive electrodes of each of the conductive electrode capacitors C22) should preferably be smaller than the size of the gate of a MOS transistor serving as each of the MOS capacitors C21 (size of the gate portion of each of the MOS capacitors C21). In this case, the capacitance of the conductive electrode capacitors C22 is smaller than the capacitance of the MOS capacitors C21. That is to say, the conductive electrode capacitors C22 should be designed to provide a capacitance that is large enough to expand the margin of a low-voltage operating point.

FIG. 5 is a circuit diagram showing an embodiment of a booster circuit of the present invention. In FIG. 5, there are shown a boost timing controller 1 for adjusting the timing of a boost operation, a boost capacitor unit 2 including capacitors for producing a booster voltage, and a booster unit 3 for holding the booster voltage in the form of charge.

As shown in FIG. 5, the boost timing controller 1 includes P-channel type MOS transistors TP11 and TP12, N-channel type MOS transistors TN11 and TN12, and inverters I10 to I19. The booster unit 3 includes P-channel type MOS transistors TP31 and TP32, N-channel type MOS transistors TN31 to TN39, and a capacitor C30. A boost activation signal pmpz is supplied to the boost timing control circuit 1. Every time the boost activation signal pmpz is driven high or low, the booster voltage is supplied to enable production of a high voltage VPP.

The boost capacitor unit 2 comprises MOS capacitors C211 to C214 and conductive electrode capacitors C221 to C224 connected in parallel with the MOS capacitors C211 to C214. The booster circuit of this embodiment, shown in FIG. 5 is different from the booster circuit shown in FIG. 1 in the point that the conductive electrode capacitors C221 to C224 are connected in parallel with the MOS capacitors C211 to C214 in the boost capacitor unit 2. Herein, four pairs of MOS capacitors C211 to C214 and conductive electrode capacitors C221 to C224 are included. A boost operation is carried out according to the timing of the rise and fall of the boost activation signal pmpz used to control the boost operation.

Each of the conductive electrode capacitors C221 to C224 includes a first conductive electrode and second conductive electrode which are mutually opposed. The first conductive electrode (221a) and second conductive electrode (221b) and a dielectric layer (insulating layer 221c) interposed between the first and second conductive electrodes constitute a capacitor. The operations of the booster circuit shown in FIG. 5 are identical to those of the booster circuit, which is shown in FIG. 1, described with reference to FIG. 3.

Figure 6:
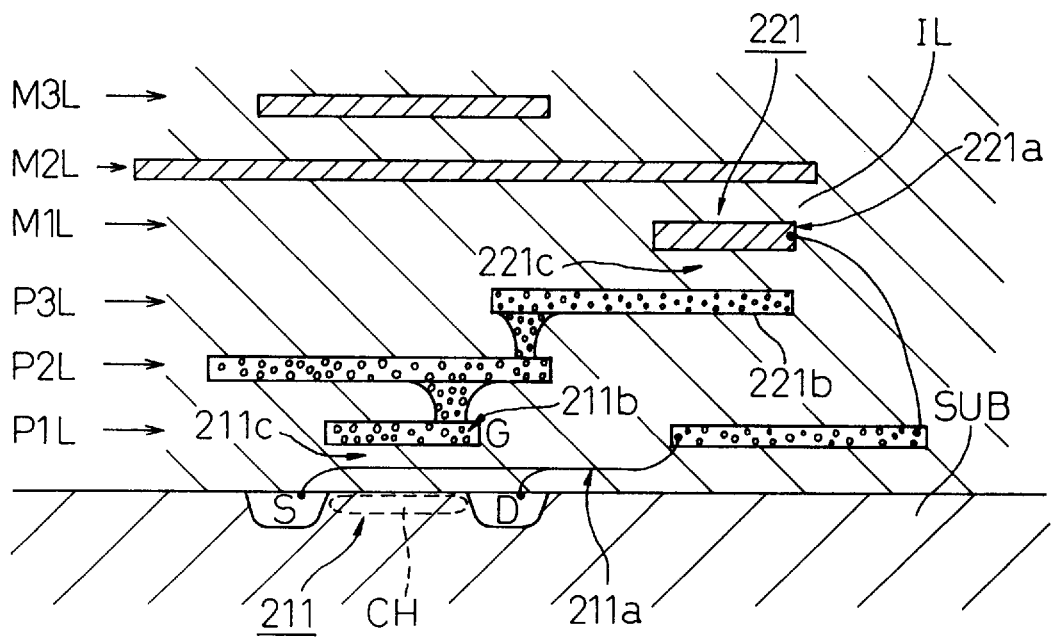
FIG. 6 is a diagram showing a model of a section of a semiconductor chip in which a booster circuit is formed.

FIG. 6 is a diagram showing a mode of a section of a semiconductor chip in which the booster circuit is formed. The semiconductor chip has a multilayer wiring structure including three polysilicon (poly crystal silicon) layers (P1L to P3L) and three metallic (aluminum) layers (M1L to M3L).

As shown in FIG. 6, the MOS capacitor C211 is formed with, for example, an N-channel type MOS transistor whose drain D and source S are strapped to form a first electrode 211a (actually a channel CH formed between the source S and drain D) and whose gate is regarded as a second electrode (211b). The first electrode 211a (channel CH between the source and drain), second electrode 211b (gate G), and a dielectric layer (insulating film: $SiO_2$ film) 211c interposed between the channel CH between the source and drain and the gate G constitute a capacitor.

The conductive electrode capacitor C221 includes a first conductive electrode 221a and second conductive electrode 221b which are mutually opposed. The first conductive electrode 221a and second conductive electrode 221b (coincident parts of the first conductive electrode 221a and second conductive electrode 221b) and a dielectric layer 221c interposed between the first and second conductive electrodes (interlayer insulating film: $SiO_2$ film or $Si_3N_4$ film) constitute a capacitor.

As shown in FIG. 6, the conductive electrode capacitor C221 has the first conductive electrode 221a in the lowermost metallic wiring layer M1L and the second conductive layer 221b in the uppermost polysilicon layer P3L. The first conductive electrode 221a and second conductive electrode 221b may be formed in adjoining conductive layers containing a multilayer wiring, for example, the lowermost polysilicon layer P1L and the immediately above second polysilicon layer P2L. The layers in which the first conductive electrode and second conductive electrode are formed are not necessarily limited to the adjoining conductive layers. The first conductive electrode 221a may be formed in the lowermost metallic wiring layer M1L and the second conductive electrode 221b may be formed in the second polysilicon layer P2L.

In consideration of the flatness of the first conductive electrode 221a and second conductive electrode 221b, that is, the uniformity in thickness of the dielectric layer between the electrodes, the first conductive electrode 221a and second conductive electrode 221b should preferably be formed in conductive layers located near the semiconductor substrate SUB. Furthermore, when the areas of the first conductive electrode 221a and second conductive electrode 221b are made larger, parasitic capacitors are created between the electrodes 221a and 221b and other adjoining electrodes. For example, a parasitic capacitor is created between the first conductive electrode 221a (lowermost metallic wiring layer M1L) in FIG. 6 and the immediately above second metallic wiring layer M2L. It is therefore undesirable to unnecessarily increase the capacitance of the conductive electrode capacitor C221 (areas of the electrodes 221a and 221b).

Figure 7:
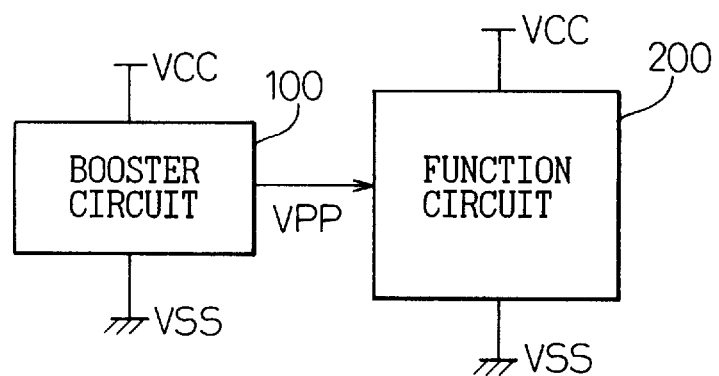
FIG. 7 is a block diagram showing a model of a semiconductor integrated circuit to which the booster circuit of the present invention is adapted.

FIG. 7 is a block diagram showing a model of a semiconductor integrated circuit to which the booster circuit of the present invention is adapted. As shown in FIG. 7, the semiconductor integrated circuit is, for example, formed as a one-chip IC, and includes a booster circuit 100 and functional circuit 200. An output voltage VPP of the booster circuit 100 is supplied to the functional circuit 200 and used as a voltage enabling the functional circuit 200 to carry out a given operation. More particularly, the functional circuit 200 is, for example, a DRAM. The output voltage of the booster circuit is used as a high voltage for selecting a given memory cell according to an address signal or used as a voltage for generating a high voltage needed for selecting a memory cell. The semiconductor integrated circuit (functional circuit) is thought to be adaptable to various functions that require a booster voltage. The booster circuit of the present invention can be widely adopted for generating the booster voltage.

As described so far, according to the booster circuit of the present invention, since conductive electrode capacitors are connected in parallel with MOS capacitors, the margin of a low-voltage operating point can be expanded while an increase in area occupied by the circuit is suppressed.

Many different embodiments of the present invention may be constructed without departing from the spirit and scope of the present invention, and it should be understood that the present invention is not limited to the specific embodiments described in this specification, except as defined in the appended claims.

What is claimed is:

1. A booster circuit for boosting a first voltage using a capacitor unit so as to generate a second voltage, wherein said capacitor unit comprising:
   at least one MOS capacitor each formed by a MOS transistor; and
   at least one conductive electrode capacitor, each connected in parallel with corresponding MOS capacitor, and each conductive electrode capacitor including a first conductive electrode and a second conductive electrode which are mutually opposed, and a dielectric layer interposed between said first and second conductive electrodes, a capacitance value of each of said conductive electrode capacitors being set to be smaller than a capacitance value of each of said MOS capacitors.

2. A booster circuit for boosting a first voltage using a capacitor unit so as to generate a second voltage, wherein said capacitor unit comprising:
   at least one MOS capacitor each formed by a MOS transistor; and
   at least one conductive electrode capacitor, each connected in parallel with corresponding MOS capacitor, and each conductive electrode capacitor including a first conductive electrode and a second conductive electrode which are mutually opposed, and a dielectric layer interposed between said first and second conductive electrodes, a size of said first and second conductive electrodes constituting each conductive electrode capacitor being set to be smaller than that of the gate of the MOS transistor constituting each MOS capacitor.

3. A booster circuit as claimed in claim 2, wherein said first conductive electrode of each conductive electrode capacitor is formed in a first conductive layer containing a multilayer wiring, said second conductive electrode thereof is formed in a second conductive layer containing a multilayer wiring, and said dielectric layer is formed with an interlayer insulating film interposed between said first conductive layer and said second conductive layer.

4. A booster circuit as claimed in claim 3, wherein said first conductive layer and said second conductive layer are adjoining conductive layers.

5. A booster circuit as claimed in claim 4, wherein said first conductive layer is a lowermost metallic wiring layer, and said second conductive layer is an uppermost polysilicon layer.

6. A booster circuit as claimed in claim 3, wherein said first conductive layer and said second conductive layer are conductive layers located near a semiconductor substrate.

7. A semiconductor integrated circuit comprising a booster circuit for boosting a first voltage using a capacitor unit so as to generate a second voltage and a functional circuit for receiving an output voltage of said booster circuit, and being formed as a one-chip circuit, wherein said capacitor unit comprising:
   at least one MOS capacitor each formed by a MOS transistor; and
   at least one conductive electrode capacitor, each connected in parallel with corresponding MOS capacitor, and each conductive electrode capacitor including a first conductive electrode and a second conductive electrode which are mutually opposed, and a dielectric layer interposed between said first and second conductive electrodes, a capacitance value of each of said conductive electrode capacitors being set to be smaller than a capacitance value of each of said MOS capacitors.

8. A semiconductor integrated circuit comprising a booster circuit for boosting a first voltage using a capacitor unit so as to generate a second voltage and a functional circuit for receiving an output voltage of said booster circuit, and being formed as a one-chip circuit, wherein said capacitor unit comprising:
   at least one MOS capacitor each formed by a MOS transistor; and at least one conductive electrode capacitor, each connected in parallel with corresponding MOS capacitor, and each conductive electrode capacitor including a first conductive electrode and a second conductive electrode which are mutually opposed, and a dielectric layer interposed between said first and second conductive electrodes, a size of said first and second conductive electrodes constituting each conductive electrode capacitor being set to be smaller than that of the gate of the MOS transistor constituting each MOS capacitor.

9. A semiconductor integrated circuit as claimed in claim 8, wherein said first conductive electrode of each conductive electrode capacitor is formed in a first conductive layer containing a multilayer wiring, said second conductive electrode thereof is formed in a second conductive layer containing a multilayer wiring, and said dielectric layer is formed with an interlayer insulating film interposed between said first conductive layer and said second conductive layer.

10. A semiconductor integrated circuit as claimed in claim 9, wherein said first conductive layer and said second conductive layer are adjoining conductive layers.

11. A semiconductor integrated circuit as claimed in claim 10, wherein said first conductive layer is a lowermost metallic wiring layer, and said second conductive layer is an uppermost polysilicon layer.

12. A semiconductor integrated circuit as claimed in claim 9, wherein said first conductive layer and said second conductive layer are conductive layer located near a semiconductor substrate.

* * * * *